United States Patent Office 3,458,466
Patented July 29, 1969

3,458,466
METHOD FOR PREPARING LATEXES HAVING
IMPROVED PROPERTIES
Walter J. Lee, Lake Jackson, Tex., assignor to The Dow
Chemical Company, Midland, Mich., a corporation of
Delaware
No Drawing. Filed June 9, 1965, Ser. No. 462,734
Int. Cl. C08f 1/13, 29/46; B08f 3/76
U.S. Cl. 260—29.6                                    6 Claims

ABSTRACT OF THE DISCLOSURE

Latex compositions having improved rheological properties are prepared by emulsion polymerizing (a) from about 1 to about 10 percent of $\alpha,\beta$-monoethylenically unsaturated carboxylic acid monomers and (b) about 90 to about 99 percent of at least one monovinylidene monomer by a process which comprises the steps of (1) heating an aqueous system containing a free radical polymerization catalyst and an emulsifier in an inert atmosphere to a temperature of up to about 90° C., (2) continuously adding to the aqueous system the monomers in the proportions defined above together with an amount of an alkaline compound to provide the aqueous system with a pH value between about 5 and about 7.2 during the polymerization.

---

This invention relates to an improved process for aqueous emulsion polymerization to produce latexes. It particularly concerns the preparation of latexes having improved rheological properties.

In the well known art of emulsion polymerization a monomeric liquid composition comprising a polmerizable ethylenically unsaturated compound is colloidally emulsified in an aqueous medium that usually contains a wetting agent and a polymerization catalyst. The resulting colloidal emulsion is then subjected to conditions conducive to polymerization of the monomeric constituents to produce an aqueous colloidal dispersion of the corresponding polymeric product. That latter colloidal dispersion is commonly referred to as a latex.

The rheological properties of a latex frequently are of prime significance in the performance of that latex in a given utility. For example, in the formulation of latex paints it is known that the rheology of the latex vehicle determines in significant measure many of the paint properties, including brush drag, leveling, and others. With the prior known acrylic latexes, it has generally been necessary for delicate post formulation to be carried out to arrive at a satisfactory latex having rheological properties and other characteristics suitable for the formulation of coating compositions such as latex paints.

In accordance with the present invention latex compositions having improved rheological properties are prepared by dispersing in an aqueous medium the copolymerization product in percent by weight of (A) From about 1 to about 10 percent of $\alpha,\beta$-monoethylenically unsaturated mono- and polycarboxylic acid monomers having from 3 to 8 carbon atoms (B) About 90 to about 99 percent of at least one monovinylidene monomer selected from the cyclohexyl esters and alkyl esters of acrylic acids having the formula $$H_2C=C-\overset{\overset{\displaystyle O}{\|}}{C}-OH$$
$$\underset{R}{|}$$

wherein R is hydrogen or a methyl group, the alkyl portion of the ester having from 1 to 12 carbon atoms, compounds of the formula

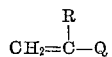

wherein R is hydrogen or methyl and Q is selected from the class consisting of the radicals —CN and an aromatic hydrocarbon radical having from 6 to 12 carbon atoms, and vinyl esters of saturated carboxylic acids having from 2 to 4 carbon atoms, the esters of acrylic acid constituting at least 10 percent by weight of the copolymerization product, by an emulsion polymerization process which comprises the steps of (1) heating an aqueous system containing a catalyzing amount of a free radical polymerization catalyst and an emulsifier in an inert atmosphere to a temperature of up to about 90° C., (2) continuously adding to the aqueous system the monomers in the proportions defined above together with an amount of an alkaline compound selected from the group consisting of ammonia and the hydroxides of ammonia, sodium and potassium being sufficient to provide the aqueous system with a pH value between about 5 and about 7.2 during the polymerization.

Illustrative of the $\alpha,\beta$-ethylenically unsaturated carboxylic acids which may be employed in the process of the present invention include acrylic acid, methacrylic acid, crotonic acid, itaconic acid, fumaric acid and maleic acid.

Typical of the esters of acrylic acids which may be employed in the present invention are methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, n-amyl methacrylate, isoamyl methacrylate, hexyl methacrylate, 2-ethylbutyl methacrylate, octyl methacrylate, 3,5,5-trimethylhexyl methacrylate, decyl methacrylate, cyclohexyl acrylate and cyclohexyl methacrylate.

Exemplary of other monovinylidene monomers which may be employed in the process of the present invention are styrene, $\alpha$-methylstyrene, vinyltoluene, vinylxylene, isopropylstyrene, tert-butylstyrene, ethyl vinylbenzene, acrylonitrile, methacrylonitrile and the like.

Examples of vinyl esters include vinyl acetate, vinyl propionate and vinyl butyrate.

In preparing the latex compositions the procedure of polymerization is one conventionally employ in the emulsion polymerization art. In general the latex compositions of the present invention are prepared by gradual addition of the monomer portions to the aqueous polymerization zone heated to a temperature of about 20° C. to about 90° C. containing an emulsifying agent and a free radical polymerization catalyst, along with a sufficient amount of an alkaline compound which may be either ammonia, ammonium hydroxide, sodium hydroxide or potassium hydroxide to provide the aqueous system with a pH between about 5 to about 7.2.

Emulsifiers pursuant to conventional practice are usually required for the combination of monomers employed in the present practice and to maintain the formed polymeric latexes in stable dispersions. The amounts of emulsifiers required depend primarily on the concentration of monomers to be handled and, to a further extent, with the choice of emulsifiers, monomers, and proportions of monomers. Generally, the amount of emulsifying agent required falls between about 0.01 percent and about 4 weight percent of the mixture of monomers.

Typical emulsifying agents which may be used include such nonionic agents as the alkyl phenoxy polyethoxyethanols having alkyl groups of about 7 to about 12 carbon atoms; polyethoxyethanol derivatives of methylene-linked alkyl phenols; condensation products of ethylene oxide with alkyl thiophenols having alkyl groups of about 6 to about 15 carbon atoms; and anionic agents, such as alkali metal salts of alkyl benzene sulfonic acids and alkyl toluene sulfonic acids having aliphatic side chains of about 10 to about 15 carbon atoms and the like.

As polymerization catalysts, there may be used one or more peroxides which are known to act as free-radical catalysts and which are water soluble. Ususally convenient are the persulfates (including ammonium, sodium, and potassium persulfates), hydrogen peroxide, or the perborates or percarbonates. There may also be used organic peroxides, either alone or in addition to an inorganic peroxide compound. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, and the like. The usual amount of catalyst required is roughly from about 0.01 percent to about 2 percent by weight as based on the weight of the monomer mixture.

When all of the monomer mixture has been added to the continuous, aqueous phase, the copolymer latex is generally allowed to further polymerize without upsetting the reaction conditions by the addition of more ingredients. This reaction period is generally referred to in emulsion polymerization processes as the digestion stage. It usually assists the attainment of the desired polymeric latex in good yield.

This digestion stage is usually continued for approximately 5 to 120 minutes. It may be most conveniently performed while maintaining the temperature within a range of from about 60° to about 85° C.

After the digestion stage, the aqueous polymeric latex dispersion is cooled to room temperature and may be then filtered to remove any undesirable gel particles which might be formed during the polymerization.

The latex products, obtained in accordance with this invention, are useful for a number of purposes. For example, the latex dispersions are useful as, or in the preparation of, coating and impregnating compositions and the coating of films and the like. They are especially advantageous for the preparation of paints having good leveling properties.

To illustrate the manner in which the invention may be carried out, the following examples are given. It is to be understood, however, that the examples are for the purpose of illustration and the invention is not to be regarded as limited to any of the specific materials or conditions recited therein.

Example 1

Into a 5 liter reaction vessel equipped with an agitator, reflux condenser, dropping funnel, thermometer, inert gas line and pH probe was added 336 parts water and 0.2 part of an anionic surfactant, sodium dodecyldiphenyl ether disulfonate. The aqueous system was heated to 80° C. and 0.4 part of $K_2S_2O_8$ was added to the aqueous solution along with the following monomer charge:

| | Parts |
|---|---|
| Ethyl acrylate | 156 |
| Methyl methacrylate | 115 |
| Butyl acrylate | 17 |
| Methacrylic acid | 11.5 |

The monomer charge was gradually added to the reactor over a 95 minute period along with sufficient gaseous ammonia bubbled into the reactor to maintain the pH of the reaction at 5.0 to 5.6. The mixture was digested at 80° C. for an additional 90 minutes and the pH of the dispersion raised to 8.6 by the addition of $NH_4OH$. The resultant latex contained 47 percent by weight solids.

A paint formulation was prepared from 100 parts of the latex and 54.7 parts of a pigment slip having the following composition:

| Ingredient: | Parts by weight |
|---|---|
| Water | 116.0 |
| Potassium tripolyphosphate | 2.0 |
| 25 percent aqueous solution of sodium sulfosuccinate | 4.0 |
| Titanium dioxide, pigment grade | 100.0 |
| 325 mesh mica, waterground | 50.0 |
| 2 percent solution of carboxymethyl cellulose (4,000 cps.) | 99.5 |
| Polyethylene glycol (average molecular weight about 1,200) | 2.0 |
| Modified wax defoamer (50 percent aqueous dispersion) | 4.0 |
| 22 percent aqueous solution of Na salt of polyacrylic acid | 4.0 |
| 28 percent $NH_4OH$ | 4.0 |

To demonstrate the leveling properties of the paint, the paint was applied to a flat pine panel surface purposely making some of the brush strokes transverse to others. When the paint was dried it was observed that the brush marks had disappeared.

By way of contrast a paint formulation prepared in an identical manner from a latex which had also been prepared in a similar manner to the above described latex with the exception that the pH was not adjusted with ammonia during the polymerization, the paint when applied to the wood surface left brush marks after drying.

Example 2

A latex was prepared according to the polymerization procedure of Example 1 using the following monomer charge:

| | Parts |
|---|---|
| Ethyl acrylate | 134 |
| Methyl methacrylate | 66 |
| Acrylic acid | 1 |
| Methacrylic acid | 2 |

The pH of the polymerization mixture was maintained at 7.2 with $NH_3$ during the addition of the monomers and the digestion period. After digeestion, the pH of the latex was adjusted to 7.5 by the addition of $NH_4OH$.

The leveling properties of a paint formulation prepared from the latex in a manner similar to Example 1 were similar to the paint formulation of Example 1.

A similar relative improvement in the rheological properties of latexes is achieved when equivalent amounts of the other aforementioned monomers are substituted for the monomers used in the foregoing examples in accordance with the process of the present invention.

What is claimed is:

1. An emulsion polymerization process for preparing an aqueous, dispersion of a polymeric latex comprising the copolymerization product, in percent by weight of (A) from about 1 to about 10 percent of α,β-monoethylenically unsaturated mono- and polycarboxylic acid monomers having from 3 to 8 carbon atoms and (B) about 90 to about 99 percent of at least one monovinylidene monomer selected from the group consisting of cyclohexyl esters and alkyl esters of acids having the formula

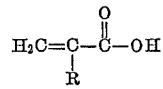

wherein R is selected from the group consisting of hydrogen and a methyl group, the alkyl portion of the ester having from 1 to 12 carbon atoms, compounds of the formula

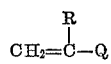

wherein R is selected from the group consisting of hydrogen and methyl and Q is selected from the group consisting of the radicals —CN and an aromatic hydrocarbon radical having from 6 to 12 carbon atoms and vinyl esters of saturated carboxylic acids having from 2 to 4 carbon atoms, the esters of acrylic acid constituting at least 10 percent by weight of the copolymerization product, said process comprising the steps of (1) heating an aqueous system containing a catalyzing amount of a free radical polymerization catalyst and an emulsifier in an inert atmosphere to a temperature of up to about 90° C. (2) continuously adding to the aqueous system the monomers in the proportions defined above together with an amount of an alkaline compound selected from the group consisting of ammonia and hydroxides of ammonia, sodium and potassium being sufficient to provide the aqueous system with a pH value between about 5 and about 7.2 during the polymerization.

2. The process of claim 1 wherein the ethylenically unsaturated carboxylic acid is acrylic acid.

3. The process of claim 1 wherein the ethylenically unsaturated carboxylic acid is methacrylic acid.

4. The process of claim 1 wherein the monovinylidene monomer is ethyl acrylate.

5. The process of claim 1 wherein the monovinylidene monomer is methyl methacrylate.

6. The process of claim 1 wherein the alkaline compound is ammonia.

References Cited
UNITED STATES PATENTS

| | | | |
|---|---|---|---|
| 3,248,356 | 4/1966 | Synder | 260—29.6 |
| 3,242,123 | 3/1966 | Mayfield et al. | 260—29.6 |
| 3,271,373 | 9/1966 | Wolff | 260—80.8 |
| 3,296,167 | 1/1967 | Turner et al. | 260—29.6 |

SAMUEL H. BLECH, Primary Examiner

W. J. BRIGGS, SR., Assistant Examiner

U.S. Cl. X.R.

260—41, 78.5, 80.8, 80.81, 85.5, 85.7, 86.1, 88.1